(12) United States Patent
Georgin et al.

(10) Patent No.: US 10,131,329 B1
(45) Date of Patent: Nov. 20, 2018

(54) BRAKE SYSTEM POWER ARBITRATION

(71) Applicant: GOODRICH CORPORATION, Charlotte, NC (US)

(72) Inventors: Marc Georgin, Dayton, OH (US); Eric Daniel Cahill, Troy, OH (US)

(73) Assignee: Goodrich, Corporation, Charlotte, NC (US)

( * ) Notice: Subject to any disclaimer, the term of this patent is extended or adjusted under 35 U.S.C. 154(b) by 0 days.

(21) Appl. No.: 15/631,537

(22) Filed: Jun. 23, 2017

(51) Int. Cl.
| B64C 25/44 | (2006.01) |
| B60T 8/17 | (2006.01) |
| B60T 8/172 | (2006.01) |
| B60T 8/174 | (2006.01) |
| B60T 8/1755 | (2006.01) |
| B60T 8/32 | (2006.01) |

(52) U.S. Cl.
CPC ............ *B60T 8/1703* (2013.01); *B60T 8/172* (2013.01); *B60T 8/174* (2013.01); *B60T 8/17551* (2013.01); *B60T 8/325* (2013.01); *B60T 2270/40* (2013.01)

(58) Field of Classification Search
CPC .... B60T 8/1703; B60T 8/325; B60T 2270/40; B60T 2270/402; B60T 2270/403; B60T 2270/413
See application file for complete search history.

(56) References Cited

U.S. PATENT DOCUMENTS

| 4,007,970 A | 2/1977 | Romero | |
| 4,986,610 A | 1/1991 | Beck et al. | |
| 5,044,697 A * | 9/1991 | Longyear | B60T 8/00 244/111 |
| 6,183,051 B1 | 2/2001 | Hill et al. | |
| 6,296,325 B1 * | 10/2001 | Corio | B60T 8/1703 244/110 A |
| 6,513,885 B1 * | 2/2003 | Salamat | B60T 8/1703 303/122.09 |
| 8,602,505 B2 * | 12/2013 | Frank | B60T 8/1703 188/106 P |
| 2004/0239173 A1 * | 12/2004 | Williams | B60T 8/1703 303/3 |
| 2008/0258547 A1 * | 10/2008 | Ralea | B60T 8/1703 303/122 |
| 2010/0057320 A1 * | 3/2010 | Whittingham | B60T 8/1703 701/70 |
| 2011/0040466 A1 * | 2/2011 | Hill | B60T 8/1703 701/74 |
| 2015/0291279 A1 * | 10/2015 | Iordanidis | B60T 8/1703 188/156 |

* cited by examiner

*Primary Examiner* — Vishal R Sahni
(74) *Attorney, Agent, or Firm* — Snell & Wilmer, L.L.P.

(57) ABSTRACT

A brake system of an aircraft may include a first brake control assembly, a second brake control assembly, a first brake control unit electrically coupled to the first brake control assembly, a second brake control unit electrically coupled to the second brake control assembly, and an arbitration control module. The arbitration control module may be configured to determine an operational integrity of the first brake control unit and the second brake control unit. In response to determining that one of the first brake control unit and the second brake control unit does not have sufficient operational integrity, the arbitration control module may enable the other of the first brake control unit and the second brake control unit to control both the first brake control assembly and the second brake control assembly.

11 Claims, 6 Drawing Sheets

BRAKE SYSTEM POWER ARBITRATION

FIELD

The present disclosure relates to aircraft systems, and more specifically, to brake control systems.

BACKGROUND

Aircraft typically have brakes on the wheels to slow the aircraft during landings, aborted takeoffs, and/or while taxiing. Additionally, some aircraft employ multiple brake assemblies, such as an inboard brake hydraulic assembly and an outboard brake hydraulic assembly. In some aircraft, multiple brake controllers are utilized to respectively control the multiple brake assemblies. If one of the brake controllers were to fail or otherwise become operationally compromised, the corresponding brake assembly would cease to operate or would not operate as desired, thereby compromising the braking ability of the aircraft.

SUMMARY

In various embodiments, the present disclosure provides a brake system of an aircraft. The brake system may include a first brake control assembly, a second brake control assembly, a first brake control unit electrically coupled to the first brake control assembly, and a second brake control unit electrically coupled to the second brake control assembly. The brake system also includes an arbitration control module configured to determine an operational integrity of the first brake control unit and the second brake control unit, according to various embodiments. In response to determining that one of the first brake control unit and the second brake control unit does not have sufficient operational integrity, the arbitration control module enables the other of the first brake control unit and the second brake control unit to control both the first brake control assembly and the second brake control assembly, according to various embodiments.

In various embodiments, in response to determining that the one of the first brake control unit and the second brake control unit does not have sufficient operational integrity, the arbitration control module disables control signal output from the one of the first brake control unit and the second brake control unit. In various embodiments, the arbitration control module consists of hardware. In various embodiments, the first brake control assembly includes a first primary power receiving element and a first secondary power receiving element. In various embodiments, the second brake control assembly includes a second primary power receiving element and a second secondary power receiving element. In various embodiments, the first brake control unit is electrically coupled to the first brake control assembly via the first primary power receiving element and is also electrically coupled to the second brake control assembly via the second secondary power receiving element. In various embodiments, the second brake control unit is electrically coupled to the second brake control assembly via the second primary power receiving element and is also electrically coupled to the first brake control assembly via the first secondary power receiving element.

In various embodiments, in response to determining that both the first brake control unit and the second brake control unit have sufficient operational integrity, the first brake control unit controls the first brake control assembly via the first primary power receiving element and the second brake control unit controls the second brake control assembly via the second primary power receiving element. In various embodiments, in response to determining that the first brake control unit has insufficient operational integrity, the arbitration control module switches control of the first brake control assembly to the second brake control unit by enabling the second brake control unit to control the first brake control assembly via the first secondary power receiving element. In various embodiments, in response to determining that the second brake control unit has insufficient operational integrity, the arbitration control module switches control of the second brake control assembly to the first brake control unit, wherein the first brake control unit controls the second brake control assembly via the second secondary power receiving element of the second brake control assembly.

In various embodiments, in response to determining that the first brake control unit has insufficient operational integrity, the arbitration control module disables control signal output from the first brake control unit. In various embodiments, in response to determining that the second brake control unit has insufficient operational integrity, the arbitration control module disables control signal output from the second brake control unit. In various embodiments, the first brake control assembly includes a first servo valve, the first primary power receiving element is a first primary servo coil, and the first secondary power receiving element is a first secondary servo coil. In various embodiments, the second brake control assembly includes a second servo valve, the second primary power receiving element is a second primary servo coil, and the second secondary power receiving element is a second secondary servo coil.

In various embodiments, in response to determining that the first brake control unit has insufficient operational integrity, the arbitration control module sets electrical power to the first primary servo coil to zero. In various embodiments, in response to determining that the second brake control unit has insufficient operational integrity, the arbitration control module sets electrical power to the second primary servo coil to zero.

In various embodiments, the first brake control unit is an inboard brake control unit, the first brake control assembly is an inboard brake control assembly, the second brake control unit is an outboard brake control unit, and the second brake control assembly is an outboard brake control assembly. In various embodiments, the first brake control unit is a primary brake control unit and the second brake control unit is a secondary brake control unit.

Also disclosed herein, according to various embodiments, is a brake system of an aircraft that includes a first servo valve, a second servo valve, a first brake control unit, a second brake control unit, and an arbitration control module. The first servo valve may include a first primary servo coil and a first secondary servo coil. The second servo valve may include a second primary servo coil and a second secondary servo coil. The first brake control unit may be electrically coupled to the first servo valve via the first primary servo coil and the first brake control unit may also be electrically coupled to the second servo valve via the second secondary servo coil. The second brake control unit may be electrically coupled to the second servo valve via the second primary servo coil and the second brake control unit may also be electrically coupled to the first servo valve via the first secondary servo coil. The arbitration control module may be configured to determine an operational integrity of the first brake control unit and the second brake control unit. In response to determining that one of the first brake control unit and the second brake control unit does not have sufficient operational integrity, the arbitration control module enables the other of the first brake control unit and the second brake control unit to control both the first servo valve and the second servo valve, according to various embodiments.

In various embodiments, in response to determining that both the first brake control unit and the second brake control unit have sufficient operational integrity, the first brake control unit controls the first servo valve via the first primary servo coil and the second brake control unit controls the second servo valve via the second primary servo coil. In various embodiments, in response to determining that the first brake control unit has insufficient operational integrity, the arbitration control module switches control of the first servo valve to the second brake control unit by enabling the second brake control unit to control the first servo valve via the first secondary servo coil. In various embodiments, in response to determining that the second brake control unit has insufficient operational integrity, the arbitration control module switches control of the second servo valve to the first brake control unit, wherein the first brake control unit controls the second servo valve via the second secondary servo coil.

Also disclosed herein, according to various embodiments, is a method of controlling a brake system of an aircraft. The method may include determining, by an arbitration control module, whether each of a first brake control unit and a second brake control unit has sufficient operational integrity. In various embodiments, in response to determining that both the first brake control unit and the second brake control unit have sufficient operational integrity, the first brake control unit controls a first brake control assembly via a first primary power receiving element of the first brake control assembly, and the second brake control unit controls a second brake control assembly via a second primary power receiving element of the second brake control assembly. The method may further include, in response to determining that the first brake control unit has insufficient operational integrity, switching, by the arbitration control module, control of the first brake control assembly to the second brake control unit, wherein the second brake control unit controls the first brake control assembly via a first secondary power receiving element of the first brake control assembly. Still further, the method may include, in response to determining that the second brake control unit has insufficient operational integrity, switching, by the arbitration control module, control of the second brake control assembly to the first brake control unit, wherein the first brake control unit controls the second brake control assembly via a second secondary power receiving element of the second brake control assembly.

In various embodiments, determining, by the arbitration control module, the operational integrity of each of the first brake control unit and the second brake control unit is performed using redundant watchdog timers. In various embodiments, the arbitration control module consists of hardware. In various embodiments, switching control of the first brake control assembly to the second brake control unit includes disabling control signal output from the first brake control unit and switching control of the second brake control assembly to the first brake control unit includes disabling control signal output from the second brake control unit. In various embodiments, the method further includes, in response to determining that the first brake control unit has resumed sufficient operational integrity after having insufficient operational integrity, returning, by the arbitration control module, control of the first brake control assembly to the first brake control unit via the first primary power receiving element. The method may also include, in response to determining that the second brake control unit has resumed sufficient operational integrity after having insufficient operational integrity, returning, by the arbitration control module, control of the second brake control assembly to the second brake control unit via the second primary power receiving element.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1A:
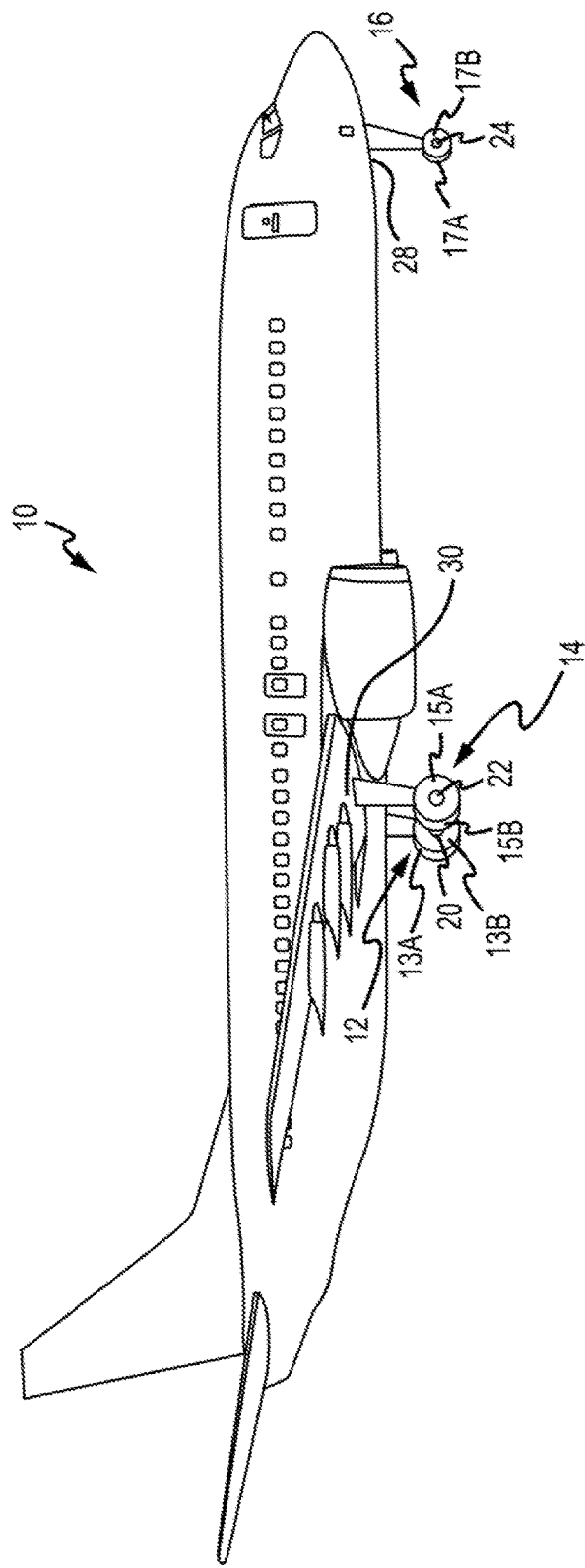
FIG. 1A illustrates an exemplary aircraft having a brake system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Referring now to FIG. 1A, in accordance with various embodiments, an aircraft 10 may include landing gear such as left main landing gear 12, right main landing gear 14 and nose landing gear 16. Left main landing gear 12, right main landing gear 14, and nose landing gear 16 may generally support aircraft 10 when aircraft 10 is not flying, allowing aircraft 10 to taxi, take off and land without damage. Left main landing gear 12 may include wheel 13A and wheel 13B coupled by an axle 20. Right main landing gear 14 may include wheel 15A and wheel 15B coupled by an axle 22. Nose landing gear 16 may include nose wheel 17A and nose wheel 17B coupled by an axle 24. In various embodiments, aircraft 10 may comprise any number of landing gears and each landing gear may comprise any number of wheels. Left main landing gear 12, right main landing gear 14, and nose landing gear 16 may each be retracted for flight. The landing gear may extend from an underside 28 of the fuselage or from an underside of the wings 30.

Aircraft 10 may also include a brake system 200 (with reference to FIG. 2A), which may be applied to a wheel of a landing gear. The brake system 200 of aircraft 10 may comprise a collection of units, assemblies, and subsystems that produce output signals for controlling the braking force and/or torque applied at each wheel (e.g., wheel 13A, wheel 13B, wheel 15A, wheel 15B, etc.). The brake system 200 may communicate with the brakes of each landing gear (e.g., left main landing gear 12, right main landing gear 14, and/or nose landing gear 16), and each brake may be mounted to each wheel to apply and release braking force on one or more wheels. The brakes of an aircraft 10 may include a non-rotatable wheel support, a wheel (e.g., wheel 13A, wheel 13B, wheel 15A, wheel 15B, wheel 17A, and/or wheel 17B) mounted to the wheel support for rotation, and a brake disk stack.

Figure 1B:
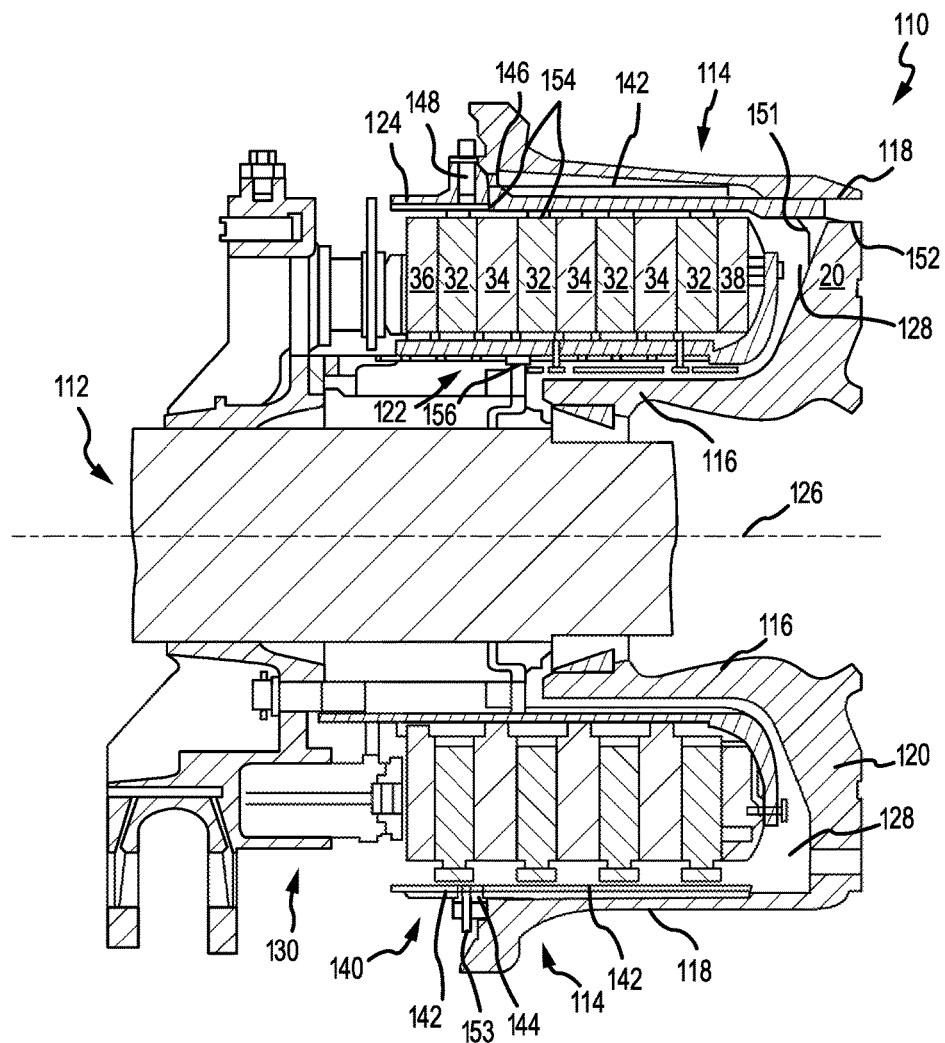
FIG. 1B illustrates a cross-sectional view of a brake assembly, in accordance with various embodiments.

Referring to FIG. 1B, brake assembly 110 may be found on an aircraft, in accordance with various embodiments. Brake assembly 110 may comprise a bogie axle 112, a wheel 114 including a hub 116 and a wheel well 118, a web 120, a torque take-out assembly 122, one or more torque bars 124, a wheel rotational axis 126, a wheel well recess 128, an actuator 130, multiple brake rotors 32, multiple brake stators 34, a pressure plate 36, an end plate 38, a heat shield 140, multiple heat shield sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., interleaved rotors 32 and stators 34) are disposed in wheel well recess 128 of wheel well 118. Rotors 32 are secured to torque bars 124 for rotation with wheel 114, while stators 34 are engaged with torque take-out assembly 122. At least one actuator 130 is operable to compress interleaved rotors 32 and stators 34 for stopping the aircraft. In this example, actuator 130 is shown as a hydraulically actuated piston. Pressure plate 36 and end plate 38 are disposed at opposite ends of the interleaved rotors 32 and stators 34. Rotors 32 and stators 34 can comprise any material suitable for friction disks, including ceramics or carbon materials, such as a carbon/carbon composite.

Through compression of interleaved rotors 32 and stators 34 between pressure plates 36 and end plate 38, the resulting frictional contact slows, stops, and/or prevents rotation of wheel 114. Torque take-out assembly 122 is secured to a stationary portion of the landing gear truck such as a bogie beam or other landing gear strut, such that torque take-out assembly 122 and stators 34 are prevented from rotating during braking of the aircraft.

Figure 2A:
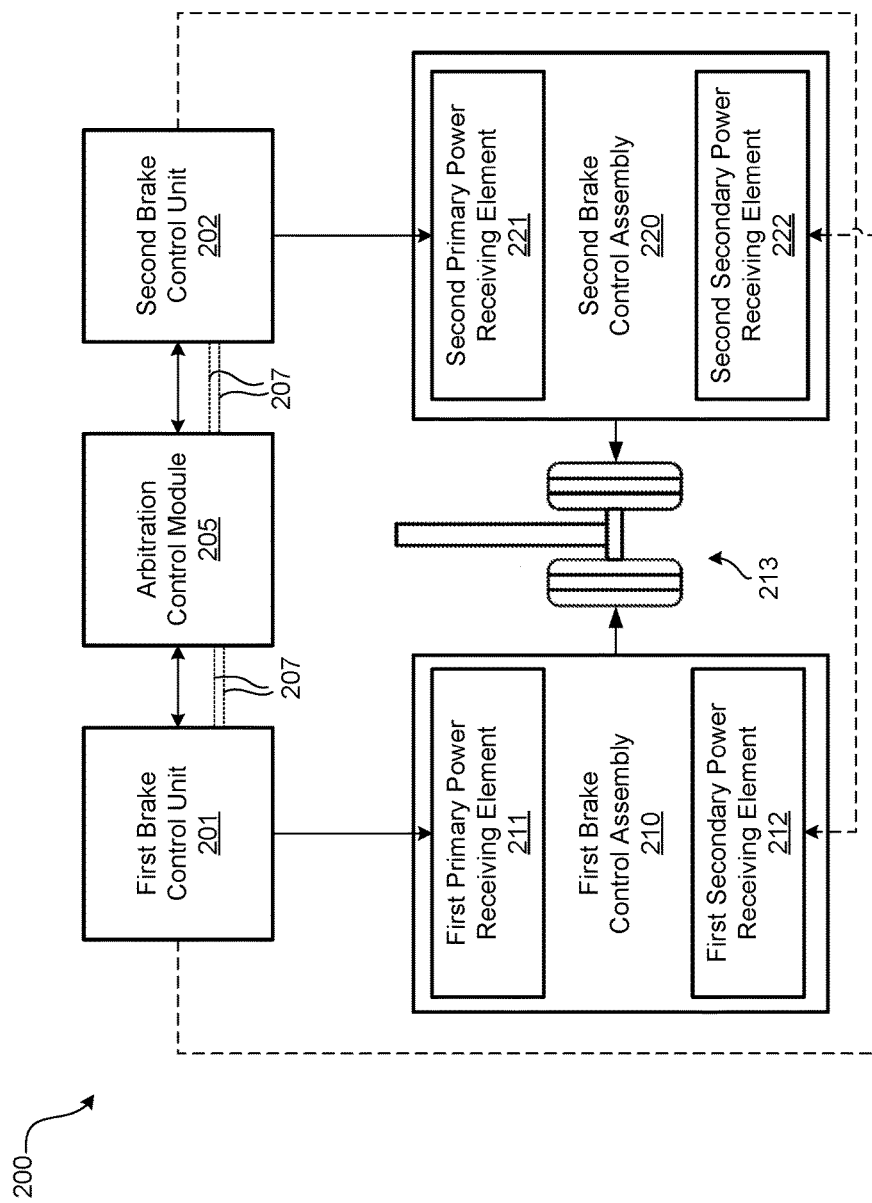
FIGS. 2A, 2B and 2C illustrate schematics of a brake system of an aircraft, in accordance with various embodiments.
Figure 2B:
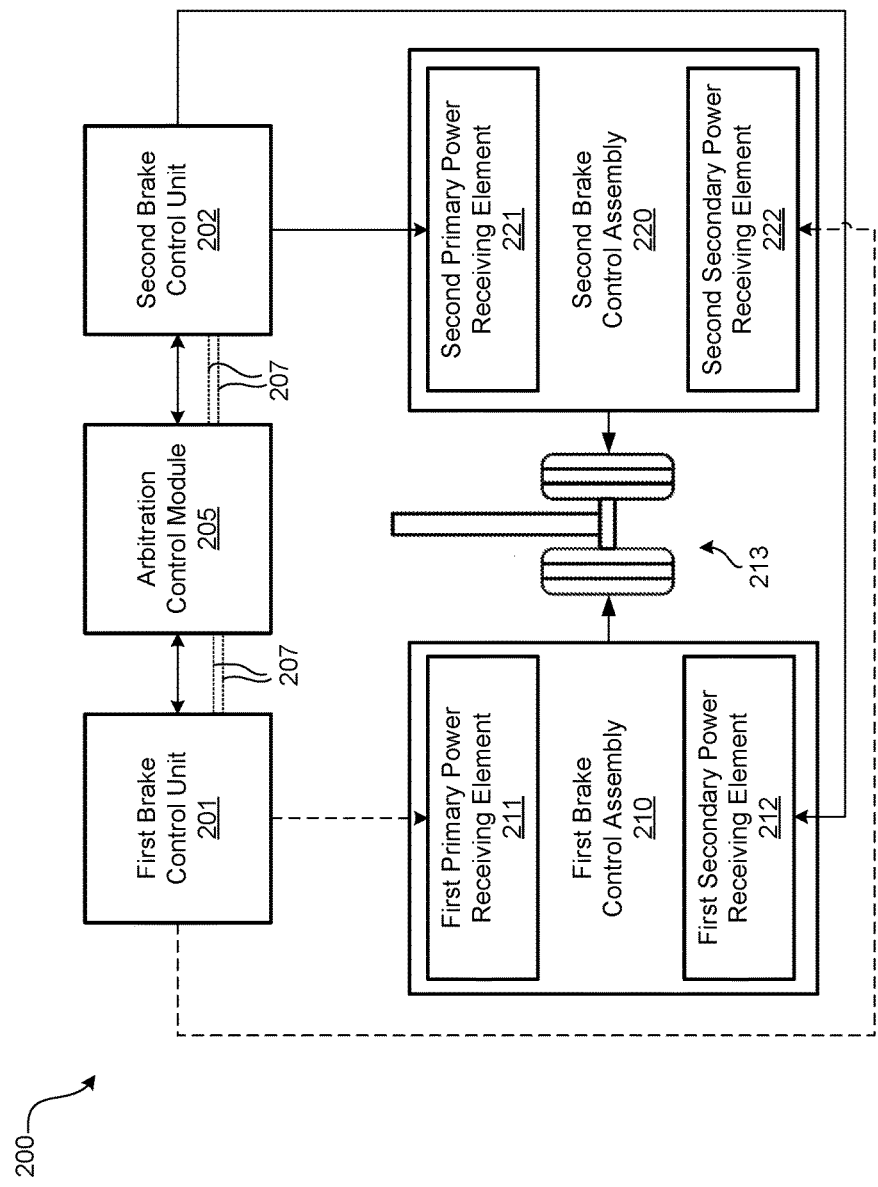
Figure 2C:
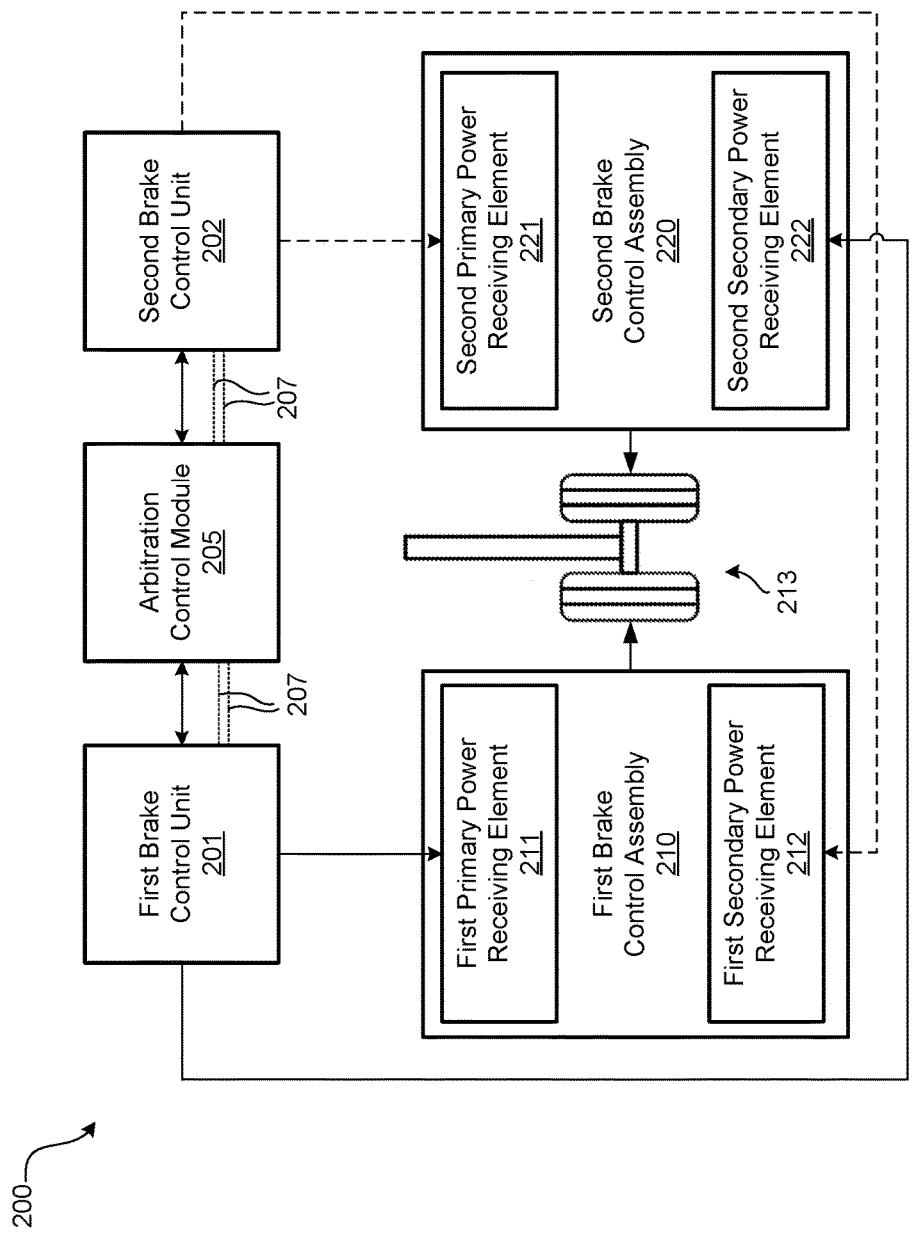

In various embodiments, and with reference to FIGS. 2A, 2B, and 2C, the brake system 200 includes a first brake control unit 201, a second brake control unit 202, a first brake control assembly 210, a second brake control assembly 220, and an arbitration control module 205. Generally, the first and second brake control units 201, 202, under standard/nominal operating conditions, control the first and second brake control assemblies 210, 220, respectively. The first and second brake control assemblies 210, 220 may each include (or may be in operable communication with) an actuator, such as actuator 130 described above with reference to FIG. 1B, to compress the interleaved rotors 32 and stators 34 and thereby effectuate braking at the wheels 213 of the aircraft. The arbitration control module 205 generally determines the operational integrity of the first and second brake control units 201, 202 and switches control of the first and second brake control assemblies 210, 220 accordingly, according to various embodiments.

The first brake control unit 201, the second brake control unit 202, and the arbitration control module 205 may be controllers integrated into components of the brake system and/or may be standalone controllers. The first brake control unit 201, the second brake control unit 202, and the arbitration control module 205 may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof.

In various embodiments, the processor(s) of the first brake control unit 201, the second brake control unit 202, and the arbitration control module 205 may be configured to implement various logical operations in response to execution of instructions, for example, instructions stored on the non-transitory memory (e.g., tangible, computer-readable medium). As used herein, the term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, various features, components, and functionality of the arbitration control module 205 are included with and implemented by the first and second brake control units 201, 202. For example, the functionality of the arbitration control module 205 may be implemented by hardware logic components of the first brake control unit 201 or the second brake control unit 202. In various embodiments, the arbitration control module 205 is independent of and separate from the first and second brake control units 201, 202. In various embodiments, the arbitration control module 205 consists of hardware. Generally, as described below, the arbitration control module 205 checks to make sure the first and second brake control units 201, 202 are properly functioning to ensure proper control of the respective first and second brake control assemblies 210, 220.

The arbitration control module 205 may be configured to determine an operational integrity of the first brake control unit 201 and the second brake control unit 202 in order to determine if said units are capable of properly controlling the first and second brake control assemblies 210, 220. Said differently, the arbitration control module 205 may be configured to monitor the first and second brake control units 201, 202 to check for logical errors, flaws, failures, or faults (e.g., software bugs). As mentioned above in the background section, a fault in a brake controller may lead to improper, inadequate, or incomplete braking effectuated by braking assemblies, thus adversely affecting the braking performance of a brake system. The arbitration control module 205 of the brake system 200 of the present disclosure, however, detects errors, flaws, failures, or faults in the brake control units 201, 202 and switches the control architecture (arbitrates power distribution) in order to account for faulty control units and still maintain operation of the first and second brake control assemblies 210, 220. Additional details pertaining to this fault detection and control switching are included below.

In various embodiments, the first brake control unit 201 is electrically coupled to the first brake control assembly 210, and the second brake control unit 202 is electrically coupled to the second brake control assembly 220. In various embodiments and with reference to FIG. 2A, in response to nominal operation of the first and second brake control units 201, 202 (i.e., with the first and second brake control units 201, 202 executing normally, as expected), the first brake control unit 201 controls the first brake control assembly 210, and the second brake control unit 202 controls the second brake control assembly 220. The first brake control unit 201 and the first brake control assembly 210 may be an inboard braking subsystem, and the second brake control unit 202 and the second brake control assembly 220 may be an outboard braking subsystem. For example, the first brake control unit 201 may be an inboard brake control unit, the first brake control assembly 210 may be an inboard brake control assembly, the second brake control unit 202 may be an outboard brake control unit, and the second brake control assembly 220 may be an outboard brake control assembly. In various embodiments, the first brake control unit 201 and the first brake control assembly 210 may be a primary braking subsystem, and the second brake control unit 202 and the second brake control assembly 220 may be a secondary braking subsystem. Thus, the first brake control unit 201 may be a primary brake control unit, and the second brake control unit 202 may be a secondary brake control unit.

In various embodiments, in response to the arbitration control module 205 determining that one of the first brake control unit 201 and the second brake control unit 202 is not operating properly (i.e., does not have sufficient operational integrity), the arbitration control module 205 enables the other of the first brake control unit 201 and the second brake control unit 202 to assume control of both the first brake control assembly 210 and the second brake control assembly 220. Said differently, upon determining that either the first brake control unit 201 or the second brake control unit 202 isn't functioning properly, the arbitration control module 205 may switch control of the brake control assembly that is usually controlled by the defective brake control unit to the other, non-defective brake control unit.

In order to make this control architecture switch possible, the first brake control assembly 210 includes a first primary power receiving element 211 and a first secondary power receiving element 212, and the second brake control assembly 220 includes a second primary power receiving element 221 and a second secondary power receiving element 222, according to various embodiments. The first brake control unit 201 is electrically coupled to the first brake control assembly 210 via the first primary power receiving element 211, and the first brake control unit 201 is also electrically coupled to the second brake control assembly 220 via the second secondary power receiving element 222, according to various embodiments. Similarly, the second brake control unit 202 is electrically coupled to the second brake control assembly 220 via the second primary power receiving element 221, and the second brake control unit 202 is also electrically coupled to the first brake control assembly 210 assembly via the first secondary power receiving element 212.

As shown in FIG. 2A (e.g., the nominal/normal operating mode), both the first and second brake control units 201, 202 are performing as they should and are thus controlling the first and second brake control assemblies 210, 220 via the first and second primary power receiving elements 211, 221, respectively, according to various embodiments. Said differently, in response to determining, by the arbitration control module 205, that both the first brake control unit 201 and the second brake control unit 202 have sufficient operational integrity, the first brake control unit 201 controls the first brake control assembly 210 via the first primary power receiving element 211, and the second brake control unit 202 controls the second brake control assembly 220 via the second primary power receiving element 221.

However, as shown in FIG. 2B, in response to determining that the first brake control unit 201 is not performing as it should (i.e., has insufficient operational integrity), the arbitration control module 205 switches control of the first brake control assembly 210 to the second brake control unit 202 (which is still functioning properly and thus has sufficient operational integrity) by enabling the second brake control unit 202 to control the first brake control assembly 210 via the first secondary power receiving element 212. Thus, with the first brake control unit 201 having insufficient operational integrity, the second brake control unit 202 assumes control of both the first brake control assembly 210 and the second brake control assembly 220. Similarly, and with reference to FIG. 2C, in response to determining that the second brake control unit 202 is not performing as it should (i.e., has insufficient operational integrity), the arbitration control module 205 switches control of the second brake control assembly 220 to the first brake control unit 201 by enabling the first brake control unit 201 to control the second brake control assembly 220 via the second secondary power receiving element 222. Thus, the first brake control unit 201 assumes control of both the first brake control assembly 210 and the second brake control assembly 220.

In various embodiments, the brake control assemblies 210, 220 include dual-coil servo valves for actuating a hydraulic actuator to effectuate braking. Accordingly, the first brake control assembly 210 may include a first servo valve, and the second brake control assembly 220 may include a second servo valve. The first servo valve may include two servo coils and the second servo valve may include two servo coils. Said differently, the first primary power receiving element 211 may be a first primary servo coil, the first secondary power receiving element 212 may be a first secondary servo coil, the second primary power receiving element 221 may be a second primary servo coil, and the second secondary power receiving element 222 may be a second secondary servo coil.

In various embodiments, determining whether the brake control units 201, 202 are functioning properly (i.e., determining whether each brake control unit has sufficient operational integrity) includes utilizing redundant watchdog timers 207. Said differently, proper logic execution by the brake control units 201, 202 would include resetting a timer built into the functionality of the brake control units 201, 202. By resetting the timer, the timer would not expire and thus the brake control units 201, 202 may be assumed to be functioning properly. However, if one of the brake control units 201, 202 fails to reset a timer, the timer will expire, thereby indicating to the arbitration control module 205 that one of the brake control units 201, 202 is faulty. In various embodiments, each of the first and second brake control units 201, 202 may include dual watchdog timer functionality. In such embodiments, the arbitration control module 205 may only reach the determination of insufficient operational integrity of one of the brake control units 201, 202 if both of the dual watchdog timers of the one brake control unit expire. In various embodiments, determining the operational integrity of the brake control units 201, 202 may be performed using other controller monitoring techniques/practices.

In various embodiments, switching the control architecture in the manner described above includes preempting control of the faulty brake control unit with the properly functioning brake control unit. In various embodiments, the arbitration control module 205 may disable control signal outputs from the faulty brake control unit. In various embodiments, the arbitration control module 205 may preemptively set the outgoing electrical power command from the faulty brake control unit to the primary power receiving element of the respective brake control assembly to zero while initiating electrical power transfer from the properly functioning brake control unit to the secondary power receiving element of the respective brake control assembly.

In various embodiments, and with reference to FIG. 2B, in response to determining that the first brake control unit 201 has insufficient operational integrity, the arbitration control module 205 may set electrical power to the first primary power receiving element 211 (e.g., the first primary servo coil) to zero while activating electric power supply to the first brake control assembly 210 via the first secondary power receiving element 212 (e.g., the first secondary servo coil). In various embodiments, and with reference to FIG. 2C, in response to determining that the second brake control unit 202 has insufficient operational integrity, the arbitration control module 205 may set electrical power to the second primary power receiving element 221 (e.g., the second primary servo coil) to zero while activating electric power supply to the second brake control assembly 220 via the second secondary power receiving element 222 (e.g., the second secondary servo coil). In various embodiments, the brake control assemblies 210, 220 may include respective shutoff valves and thus the control switching scheme may also include actuating the shutoff valves accordingly.

Figure 3:
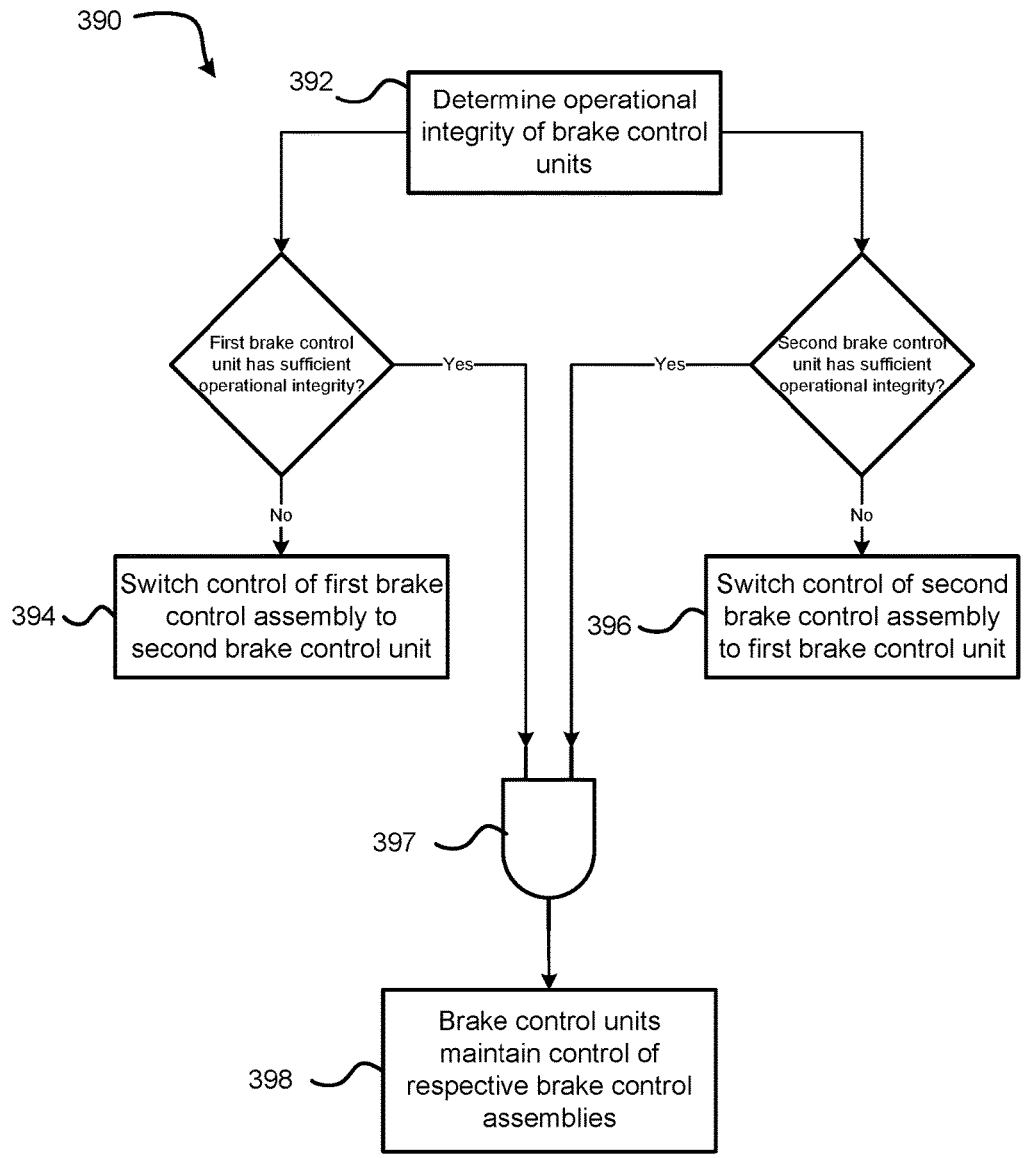
FIG. 3 is a schematic flow chart diagram of a method of controlling a brake system of an aircraft, in accordance with various embodiments.

In various embodiments, and with reference to FIG. 3, a method 390 of controlling a brake system of an aircraft is provided. The method 390 may include determining an operational integrity of brake control units at step 392. For example, step 392 may include determining, by the arbitration control module 205, whether each of the first brake control unit 201 and the second brake control unit 202 has sufficient operational integrity. In response to determining that both the first brake control unit 201 and the second brake control unit 202 have sufficient operational integrity (see "and" block 397), the brake control units 201, 202 maintain control of the respective brake control assemblies 210, 220 at step 398, according to various embodiments. In other words, the first brake control unit 201 may control the first brake control assembly 210 via the first primary power receiving element 211 and the second brake control unit 202 may control the second brake control assembly 220 via the second primary power receiving element 221.

In various embodiments, in response to determining that the first brake control unit 201 has insufficient operational integrity, the method 390 includes switching control of the first brake control assembly 210 to the second brake control unit 202 at step 394. For example, the second brake control unit 202 may control the first brake control assembly 210 via the first secondary power receiving element 212. In various embodiments, in response to determining that the second brake control unit 202 has insufficient operational integrity, the method 390 includes switching control of the second brake control assembly 220 to the first brake control unit 201 at step 396. For example, the first brake control unit 201 may control the second brake control assembly 220 via the second secondary power receiving element 222.

In various embodiments, the method 390 may include a recovery functionality. Said differently, the method 390 may further include, in response to determining that the first brake control unit 201 has resumed sufficient operational integrity after experiencing insufficient operational integrity (i.e., after repairing the first brake control unit 201 or after an intermittent fault has disappeared/resolved itself), returning control of the first brake control assembly 210 to the first brake control unit 201 via the first primary power receiving element 211. Similarly, the method 390 may further include, in response to determining that the second brake control unit 202 has resumed sufficient operational integrity after experiencing insufficient operational integrity (i.e., after repairing the second brake control unit 202 or after an intermittent fault has disappeared/resolved itself), returning control of the second brake control assembly 220 to the second brake control unit 202 via the second primary power receiving element 221.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake system of an aircraft, the brake system comprising:
a first brake control assembly comprising a first primary power receiving element and a first secondary power receiving element;
a second brake control assembly comprising a second primary power receiving element and a second secondary power receiving element;
a first brake control unit electrically coupled in power providing communication to the first brake control assembly via either the first primary power receiving element or the first secondary power receiving element;
a second brake control unit electrically coupled in power providing communication to the second brake control assembly via either the second primary power receiving element or the second secondary power receiving element; and
an arbitration control module configured to determine an operational integrity of the first brake control unit and the second brake control unit;
wherein:
in response to the arbitration control module determining that both the first brake control unit and the second brake control unit have sufficient operational integrity:
the first brake control unit is electrically coupled in power providing communication to the first brake control assembly via the first primary power receiving element; and
the second brake control unit is electrically coupled in power providing communication to the second brake control assembly via the second primary power receiving element;
in response to the arbitration control module determining that the first brake control unit does not have sufficient operational integrity:
the arbitration control module sets electrical power transfer from the first brake control unit to the first primary power receiving element of the first brake control assembly to zero; and
the arbitration control module activates electrical power transfer from the second brake control unit to the first secondary power receiving element of the first brake control assembly;
in response to the arbitration control module determining that the second brake control unit does not have sufficient operational integrity:
the arbitration control module sets electrical power transfer from the second brake control unit to the second primary power receiving element of the second brake control assembly to zero; and
the arbitration control module activates electrical power transfer from the first brake control unit to the second secondary power receiving element of the second brake control assembly.

2. The brake system of claim 1, wherein the arbitration control module consists of hardware.

3. The brake system of claim 1, wherein:
the first brake control assembly comprises a first servo valve;
the first primary power receiving element is a first primary servo coil;
the first secondary power receiving element is a first secondary servo coil;
the second brake control assembly comprises a second servo valve;
the second primary power receiving element is a second primary servo coil; and
the second secondary power receiving element is a second secondary servo coil.

4. The brake system of claim 1, wherein:
the first brake control unit is an inboard brake control unit;
the first brake control assembly is an inboard brake control assembly;
the second brake control unit is an outboard brake control unit; and
the second brake control assembly is an outboard brake control assembly.

5. The brake system of claim 1, wherein:
the first brake control unit is a primary brake control unit; and
the second brake control unit is a secondary brake control unit.

6. A brake system of an aircraft, the brake system comprising:
a first servo valve comprising a first primary servo coil and a first secondary servo coil;
a second servo valve comprising a second primary servo coil and a second secondary servo coil;
a first brake control unit electrically coupled to the first servo valve via the first primary servo coil, wherein the first brake control unit is also electrically coupled to the second servo valve via the second secondary servo coil;
a second brake control unit electrically coupled to the second servo valve via the second primary servo coil, wherein the second brake control unit is also electrically coupled to the first servo valve via the first secondary servo coil; and
an arbitration control module configured to determine an operational integrity of the first brake control unit and the second brake control unit, wherein, in response to determining that one of the first brake control unit and the second brake control unit does not have sufficient operational integrity, the arbitration control module enables the other of the first brake control unit and the second brake control unit to control both the first servo valve and the second servo valve by setting electrical power transfer from the one of the first brake control unit and the second brake control unit to zero and by activating electrical power transfer from the other of the first brake control unit and the second brake control unit to both the first servo valve and the second servo valve.

7. The brake system of claim 6, wherein the arbitration control module consists of hardware.

8. The brake system of claim 6, wherein:
in response to the arbitration control module determining that both the first brake control unit and the second brake control unit have sufficient operational integrity:
the first brake control unit is electrically coupled in power providing communication to the first servo valve via the first primary servo coil; and
the second brake control unit is electrically coupled in power providing communication to the second servo valve via the second primary servo coil;
in response to the arbitration control module determining that the first brake control unit does not have sufficient operational integrity:
the arbitration control module sets electrical power transfer from the first brake control unit to the first primary servo coil of the first servo valve to zero; and
the arbitration control module activates electrical power transfer from the second brake control unit to the first secondary servo coil of the first servo valve;
in response to the arbitration control module determining that the second brake control unit does not have sufficient operational integrity:
the arbitration control module sets electrical power transfer from the second brake control unit to the second primary servo coil of the second servo valve to zero; and
the arbitration control module activates electrical power transfer from the first brake control unit to the second secondary servo coil of the second servo valve.

9. A method of controlling a brake system of an aircraft, the method comprising:
determining, by an arbitration control module, whether each of a first brake control unit and a second brake control unit has sufficient operational integrity, wherein
in response to determining that both the first brake control unit and the second brake control unit have sufficient operational integrity, the first brake control unit powers a first brake control assembly via a first primary power receiving element of the first brake control assembly, and the second brake control unit powers a second brake control assembly via a second primary power receiving element of the second brake control assembly;
in response to determining that the first brake control unit has insufficient operational integrity, switching, by the arbitration control module, power supplied to the first brake control assembly from the first brake control unit to the second brake control unit, wherein the second brake control unit powers the first brake control assembly via a first secondary power receiving element of the first brake control assembly; and
in response to determining that the second brake control unit has insufficient operational integrity, switching, by the arbitration control module, power supplied to the second brake control assembly from the second brake control unit to the first brake control unit, wherein the first brake control unit powers the second brake control assembly via a second secondary power receiving element of the second brake control assembly.

10. The method of claim 9, wherein determining, by the arbitration control module, the operational integrity of each of the first brake control unit and the second brake control unit is performed using redundant watchdog timers.

11. The method of claim 10, wherein the arbitration control module consists of hardware.

* * * * *